(12) United States Patent
Londarenko et al.

(10) Patent No.: US 11,437,674 B2
(45) Date of Patent: Sep. 6, 2022

(54) BATTERY CELL TABS WITH A UNITARY SEAL

(71) Applicant: Apple Inc., Cupertino, CA (US)

(72) Inventors: Yuriy L. Londarenko, San Jose, CA (US); Shabab Amiruddin, Menlo Park, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/017,314

(22) Filed: Sep. 10, 2020

(65) Prior Publication Data

US 2020/0411810 A1 Dec. 31, 2020

Related U.S. Application Data

(63) Continuation of application No. 15/833,228, filed on Dec. 6, 2017, now abandoned.

(60) Provisional application No. 62/531,256, filed on Jul. 11, 2017.

(51) Int. Cl.
*H01M 50/183* (2021.01)
*H01M 50/54* (2021.01)
*H01M 4/04* (2006.01)
*H01M 6/02* (2006.01)
*H01M 6/42* (2006.01)
*H01M 4/02* (2006.01)

(52) U.S. Cl.
CPC ........... *H01M 50/183* (2021.01); *H01M 4/04* (2013.01); *H01M 6/02* (2013.01); *H01M 6/42* (2013.01); *H01M 50/54* (2021.01); *H01M 2004/021* (2013.01)

(58) Field of Classification Search
CPC .................................................. H01M 50/183
See application file for complete search history.

(56) References Cited

U.S. PATENT DOCUMENTS

| 6,515,449 B1 | 2/2003 | Thomas et al. |
| 6,797,430 B1 * | 9/2004 | Hatta .................. H01M 50/543 |
| | | 429/181 |
| 7,858,240 B2 | 12/2010 | Lee |

(Continued)

FOREIGN PATENT DOCUMENTS

| CN | 1289459 A | 3/2001 |
| CN | 101350433 A | 1/2009 |

(Continued)

OTHER PUBLICATIONS

Zhang Xiaohu et al.; "High Voltage Bipolar Power Battery for the Future Application in Electric Vehicles"; Electrical Equipment and Energy Efficiency Management Technology; vol. 14; 2016; p. 68-74 (contains English Abstract).

*Primary Examiner* — Brian R Ohara
(74) *Attorney, Agent, or Firm* — BakerHostetler

(57) ABSTRACT

The disclosed technology relates to a set of battery tabs. The battery tabs include a first tab forming an elongated member, a second tab forming an elongated member, and a unitary seal surrounding a portion of the respective elongated members of the first tab and the second tab. The unitary seal spaces the first tab apart from the second tab to create a gap between the first tab and the second tab. The first tab and second tab each connect to respective electrodes enclosed within a pouch of a battery cell to allow the cell's energy to be transferred to an external component.

25 Claims, 8 Drawing Sheets

(56) References Cited

U.S. PATENT DOCUMENTS

| | | |
|---|---|---|
| 2003/0215709 A1 | 11/2003 | Hosokawa et al. |
| 2008/0187828 A1 | 8/2008 | Oh et al. |
| 2009/0023062 A1 | 1/2009 | Kim |
| 2014/0199581 A1* | 7/2014 | Ryu .................... H01M 50/116 |
| | | 429/161 |
| 2014/0322575 A1 | 10/2014 | Hwang et al. |
| 2016/0336593 A1 | 11/2016 | Honda et al. |
| 2016/0344004 A1 | 11/2016 | Kepler et al. |
| 2019/0020000 A1 | 1/2019 | Londarenko et al. |

FOREIGN PATENT DOCUMENTS

| | | |
|---|---|---|
| CN | 102290552 | 12/2011 |
| CN | 104254934 A | 12/2014 |
| EP | 0390557 A2 | 10/1990 |
| JP | H11-233133 | 8/1999 |
| KR | 2017-0013809 A | 2/2017 |

\* cited by examiner

BATTERY CELL TABS WITH A UNITARY SEAL

PRIORITY

This application is a continuation of U.S. patent application Ser. No. 15/833,228, entitled "BATTERY CELL TABS WITH A UNITARY SEAL," filed on Dec. 6, 2017, which claims the benefit under 35 U.S.C. § 119(e) of U.S. Provisional Patent Application Ser. No. 62/531,256, entitled "BATTERY CELL TABS WITH A UNITARY SEAL," filed on Jul. 11, 2017, each of which is incorporated herein by reference in its entirety.

TECHNICAL FIELD

The present disclosure relates generally to battery cell tab structures, and more particularly, to battery cell tabs with a unitary seal.

BACKGROUND

Battery cells are presently used to provide power to a wide variety of portable electronic devices, including laptop computers, tablet computers, mobile phones, personal digital assistants (PDAs), digital music players, watches, and wearable devices. A commonly used type of battery is a lithium battery, which can include a lithium-ion or a lithium-polymer battery.

Lithium batteries often include cells that are made of alternating layers of anode and cathode electrodes, with a separator disposed there-between. The layers may be packaged in a flexible pouch. Such pouches may be tailored to various cell dimensions, allowing lithium batteries to be used in space-constrained portable electronic devices. The anode electrodes are connected together using a common anode tab and the cathode electrodes are similarly connected together using a common cathode tab. The common anode tab and the common cathode tab extend from their respective electrodes disposed within the pouch and through the pouch, to allow the cell's energy to be transferred to an external component. The pouch enclosing the anode and cathode electrodes is filled with electrolyte thereby requiring the pouch to be hermetically sealed to prevent unwanted leakage or failure.

Conventionally, the common anode tab and the common cathode tab are separate and individual components requiring alignment during assembly of batteries. Each common tab includes a separate seal that is disposed at a proximal portion of the common tab. Each seal is generally configured to engage an edge of the pouch and create a seal after application of heat.

Spacing between the common anode tab and the common cathode tab is critical to ensure that the pouch is properly sealed. While it may be desired to position the common tabs close to each other to increase packaging efficiency or reduce battery volume, positioning the common anode tab and the common cathode tab close to each other may cause the individual seals of each respective tab to overlap thereby preventing a proper seal of the pouch due to the added thickness caused by the overlapping seals. In addition, due to tolerance stack-up caused by manufacturing tolerances for each common tab, including the tolerances associated with their respective seals, the common anode tab and the common cathode tab must be sufficiently spaced apart to ensure a proper seal of the pouch, thereby adding to battery volume and reducing packaging efficiency.

SUMMARY

The disclosed embodiments provide a set of battery tabs. The set of battery tabs includes a first tab forming an elongated member, a second tab forming an elongated member, and a unitary seal surrounding the first tab and second tab. The unitary seal is configured to space the first tab apart from the second tab to create a gap between the first tab and the second tab.

In some embodiments, a battery includes a plurality of layers, a pouch enclosing the plurality of layers, and a set of tabs extending from the pouch. The plurality of layers includes a cathode with an active coating, a separator, and an anode with an active coating. The set of tabs includes a first tab, a second tab, and a unitary seal. The first tab forms an elongated member that is coupled to the anode within the pouch. The second tab forms an elongated member that is coupled to the cathode within the pouch. The unitary seal surrounds the first tab and second tab and is disposed adjacent to a sealed periphery portion of the pouch. The unitary seal also spaces the first tab apart from the second tab to create a gap between the first tab and the second tab.

In some embodiments, a method for manufacturing a roll of anode and cathode tabs is disclosed. The method includes placing a strip of anode material adjacent to a strip of cathode material, applying a sealing material across both the strip of anode material and the strip of cathode material to form a first unitary seal, applying the sealing material across both the strip of anode material and the strip of cathode material to form a second unitary seal, and rolling the strip of anode material and the strip of cathode material to form a roll of anode material and cathode material intermittently connected by the sealing material. The first unitary seal and the second unitary seal may space the strip of anode material apart from the strip of cathode material to create a gap between the strip of anode material and the strip of cathode material.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Rechargeable batteries for portable electronic devices often include cells that are made of alternating layers of anode and cathode electrodes, with a separator disposed there-between. The layers may be packaged in a flexible pouch. The anode electrodes may be connected together using a common anode tab and the cathode electrodes are similarly connected together using a common cathode tab. The common anode tab and the common cathode tab extend from their respective electrodes disposed within the pouch, through the pouch, to provide an external electrical connection to their respective electrodes disposed within the pouch. The pouch enclosing the anode and cathode electrodes is filled with electrolyte thereby requiring the pouch to be hermetically sealed to prevent unwanted leakage or failure.

Figure 1:
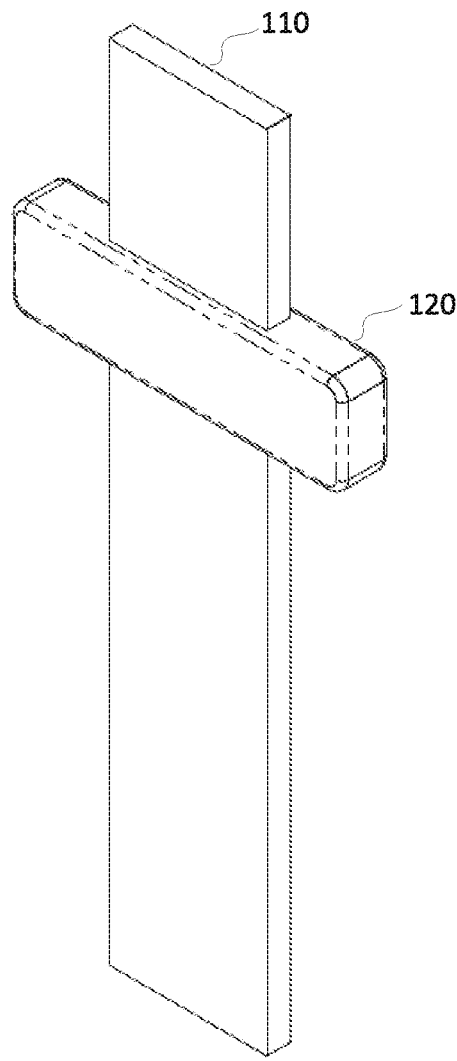
FIG. 1 illustrates an example of a common tab.
Figure 2A:
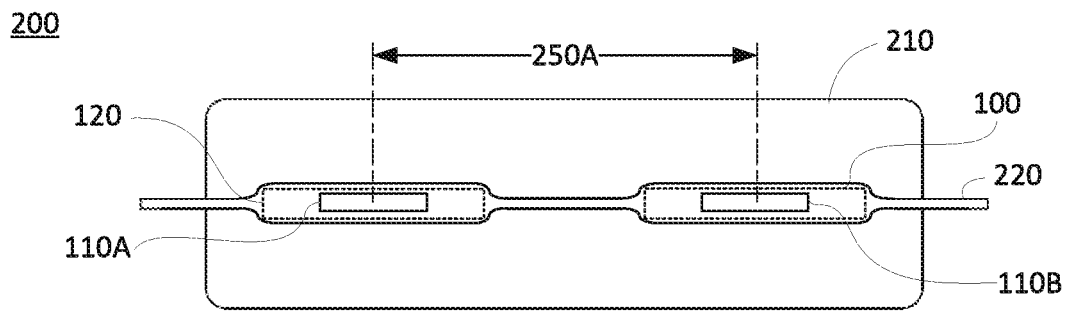
FIGS. 2A, 2B, 2C and 2D illustrate top views of an example battery cell.
Figure 2B:
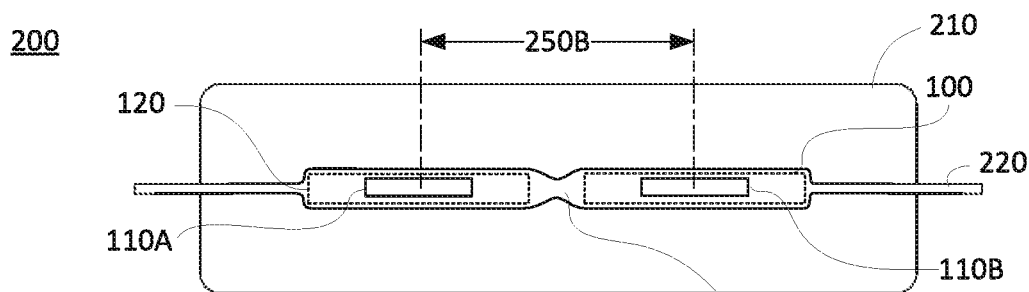
Figure 2C:
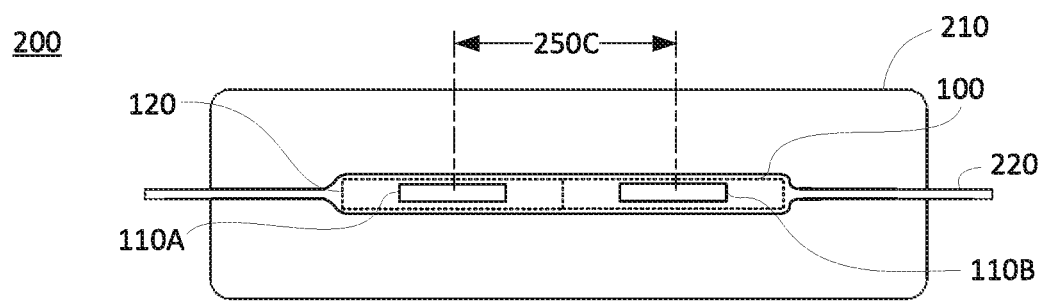
Figure 2D:
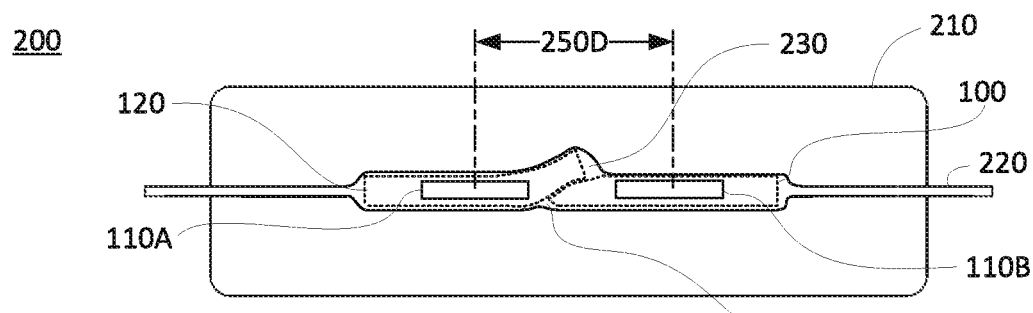

Conventionally, the common anode tab and the common cathode tab are separate and individual components requiring alignment during assembly of batteries. FIG. 1 illustrates an example of a common tab 100 as known in the prior art. The conventional common tab 100 may comprise a strip of anode or cathode material 110 with a strip of sealing material 120 disposed at a proximal portion. FIGS. 2A-2D illustrate top views of an example battery cell 200 as known in the prior art. The battery cell 200 uses two conventional common tabs 100 with a first common tab 100 having an anode strip 110A and a second common tab 100 having a cathode strip 110B. The common anode tab 110A and the common cathode tab 110B each have an individual strip of sealing material 120 that is configured to bond with a periphery edge 220 of a pouch 210 to form a seal.

Spacing between the common anode tab 110A and the common cathode tab 110B is critical to ensure that the pouch 210 is properly sealed. For example, referring to FIG. 2A, the spacing 250A between the common anode tab 110A and the common cathode tab 110B is about 11-15 mm. Spacing 250A is limited by geometry of a heating or sealing bar that is configured with detents sized to accept each of the common anode tab 110A and the common cathode tab 110B. In order to ensure a hermetic seal of the pouch 210, the common anode tab 110A and the common cathode tab 110B must be aligned with the corresponding detents of the sealing bar. Although spacing 250A may ensure a hermetic seal, the spacing 250A results in added battery volume and reduced packaging efficiency.

While it may be desired to reduce the spacing between the common anode tab 110A and the common cathode tab 110B to decrease battery volume, doing so may compromise the ability of the sealing bar to hermetically seal the periphery 220 of the pouch 210 due to the resulting geometry caused by arranging the common anode tab 110A and the common cathode tab 110B too close to each other. For example, referring to FIG. 2B, spacing 250B results in an unsealed gap 230 forming in the periphery 220 of the pouch 210 due to the difficult geometry created by the arrangement of the common anode tab 110A and the common cathode tab 110B.

Further, the spacing between the common anode tab 110A and the common cathode tab 110B is limited by the sealing material 120. For example, referring to FIG. 2C, assuming a sealing bar may be configured to accept an arrangement where the respective sealing strips 120 of the common anode tab 110A and the common cathode tab 110B abut each other despite tolerance stack-up issues caused by utilizing individual common tabs 100, the spacing 250C is limited to about 8-10 mm due to manufacturing tolerance stack-up issues caused by using a multitude of components.

Further reduction of the spacing between the common anode tab 110A and the common cathode tab 110B significantly compromises the ability of the pouch 210 to be sealed. For example, referring to FIG. 2D, positioning the common anode tab 110A and the common cathode tab 110B to the spacing 250D so that the individual sealing strips 120 overlap, results in unsealed gaps 230 forming along the periphery 220 of the pouch 210. Specifically, a proper seal is not achieved due to the added thickness caused by the overlapping sealing strips 120.

The set of battery tabs of the subject technology solves some or all of the foregoing problems by using a unitary seal that is configured to space a common anode tab apart from a common cathode tab to create a controlled and narrowed gap between the common anode tab and the common cathode tab. In one aspect, by utilizing a single unitary seal for both the common anode tab and the common cathode tab, tolerance stackup issues are eliminated enabling controlled and narrowed positioning of the common anode tab and the common cathode tab that would otherwise be unobtainable using conventional individual common tabs. In other aspects, by positioning the common anode tab and the common cathode tab in close proximity to one another, packaging efficiency is improved and battery volume is decreased without compromising the integrity of the hermetic seal of a pouch enclosing electrodes coupled to the set of battery tabs.

Figure 3A:
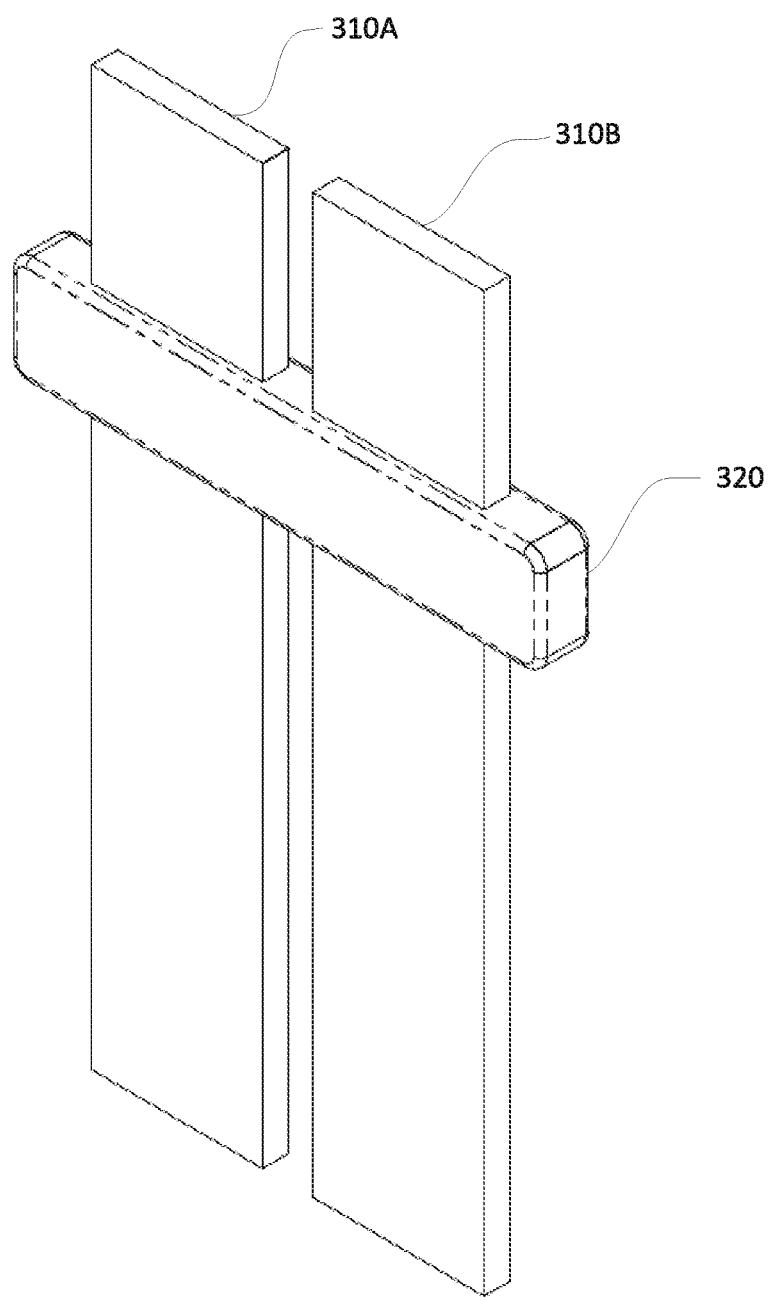
FIG. 3A illustrates a perspective view of a set of tabs with a unitary seal, in accordance with various aspects of the subject technology.

FIG. 3A illustrates a perspective view of a set of tabs 300 with a unitary seal 320, in accordance with various aspects of the subject technology. The set of battery tabs 300 comprises a first tab 310A, a second tab 310B, and the unitary seal 320. The first tab 310A may comprise an elongated member having a rectangular cross-section and may be made of a conductive material that is configured to connect to an anode. For example, the material of the first tab 310A may include graphite, gold, platinum, carbon, silver, mercury, copper, copper-plated aluminum, titanium, lead, tin, nickel, cobalt, a combination thereof, or other anodic materials as would be known by a person of ordinary skill in the art.

The second tab 310B may comprise an elongated member having a rectangular cross-section and may be made of a conductive material that is configured to connect to a a cathode. For example, the material of the second tab 310B may include lithium, potassium, sodium, magnesium, beryllium, aluminum, manganese, zinc, chromium, iron, cadmium, brass, cobalt, nickel, tin, lead, a combination thereof, or other cathodic materials as would be known by a person of ordinary skill in the art.

Figure 3B:
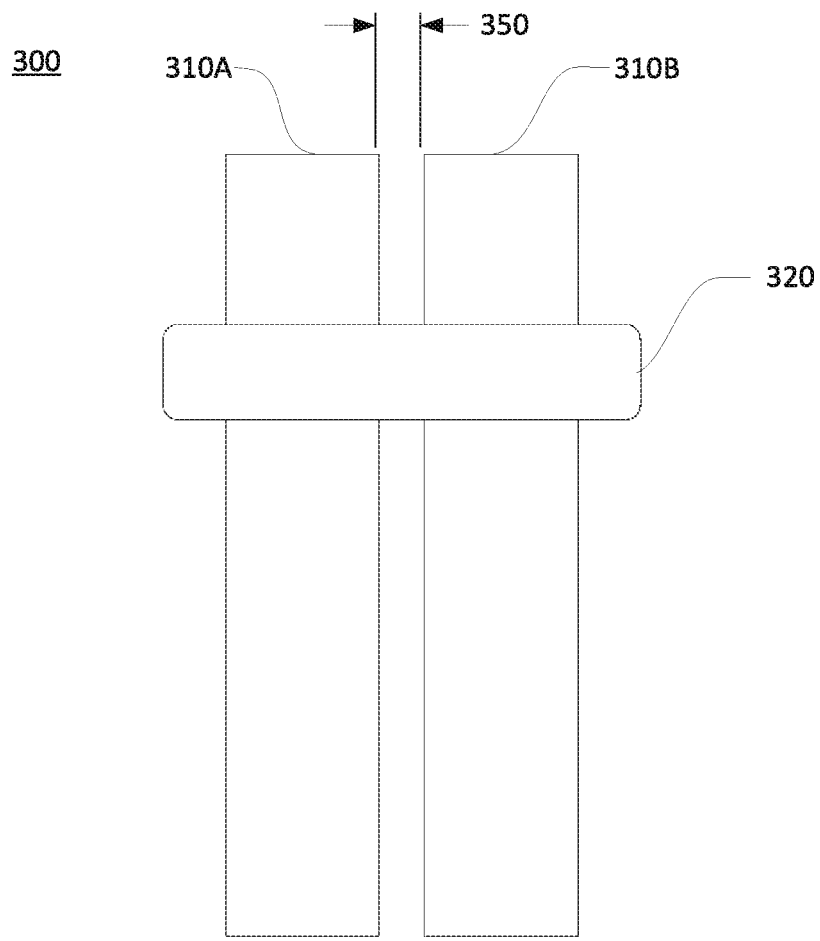
FIG. 3B illustrates a front view of a set of tabs with a unitary seal, in accordance with various aspects of the subject technology.

Referring to FIG. 3B, a front view of the set of tabs 300 with the unitary seal 320 is illustrated, in accordance with various aspects of the subject technology. The unitary seal 320 may disposed at a proximal portion of the first tab 310A and the second tab 310B and may extend beyond an outermost surface of the first tab 310A and an outermost surface of the second tab 310B. In one aspect, the unitary seal 320 extends laterally across the first tab 310A and the second tab 310B to position and maintain the relationship and orientation of the first tab 310A with respect to the second tab 310B. Alternatively, the unitary seal 320 may position and maintain the relationship and orientation of the second tab 310B with respect to the first tab 310A. For example, the unitary seal 320 may maintain the position of the first tab 310A and the second tab 310B so that the second tab 310B is in parallel with the first tab 310A. In one aspect, the unitary seal 320 may align the first tab 310A and the second tab 310B so that a proximal end of the first tab 310A is substantially on the same plane as a proximal end of the second tab 310B. In another aspect, the unitary seal 320 may align the first tab 310A and the second tab 310B so that a distal end of the first tab 310A is substantially on the same plane as a distal end of the second tab 310B.

In some aspects, the unitary seal 320 is configured to space the first tab 310A apart from the second tab 310B to create a gap 350 between the first tab 310A and the second tab 310B. The gap 350 may be about 0.5 mm, 1.0 mm, 1.5 mm, 2.0 mm, 2.5 mm, 3.0 mm, 3.5 mm, 4.0 mm, 4.5 mm or 5.0 mm. In one aspect, the gap 350 between the first tab 310A and the second tab 310B may be less than 1.0 mm, 0.9 mm, 0.8 mm, 0.7 mm, 0.6 mm, 0.5 mm, 0.4 mm, 0.3 mm, 0.2 mm, or 0.1 mm.

Figure 3C:
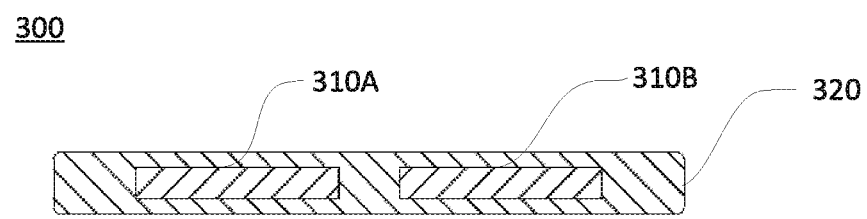
FIG. 3C illustrates a cross-section view of a set of tabs with a unitary seal, in accordance with various aspects of the subject technology.

Referring to FIG. 3C, a cross-section view of the set of tabs 300 with the unitary seal 320 is illustrated, in accordance with various aspects of the subject technology. The unitary seal 320 may completely surround a portion of the first tab 310A and second tab 310B. In one aspect, the unitary seal 320 may be formed of a heat-activated sealing material, such as polypropylene, copolymers of ethylene and acrylic acid, polyamide resins, polyester resins, ionomers, poly urethane resins, polyethylene resin (high as well as low density), nutrient cellophane, acetate films, hard and soft vinyl chloride film, polyvinylidene chloride film, polystyrene film, polycarbonate film, nylon film, or polyethylene cellophane. To surround the portion of the first tab 310A and second tab 310B, the sealing material may be applied to the first tab 310A and the second tab 310B in liquid or gel form and set or cured thereafter. For example, the sealing material may be heated to an initial temperature to enable the sealing material to bond with the first tab 310A and the second tab 310B. The sealing material may then be heated to a flow temperature to permit the sealing material to surround a portion of the first tab 310A and the second tab 310B. The sealing material may thereafter be set or cured to surround the portion of the first tab 310A and the second tab 310B by applying a setting temperature. Depending on the type of polymer used, the temperature range for the sealing material may be about 90° C. to 220° C. In other aspects, the sealing material may be bonded to or surround a portion the first tab 310A and the second tab 310B through use of a hot plate adhesive, impulse bonding, ultra-sonic bonding, high frequency bonding, or hot air bonding.

Figure 3D:
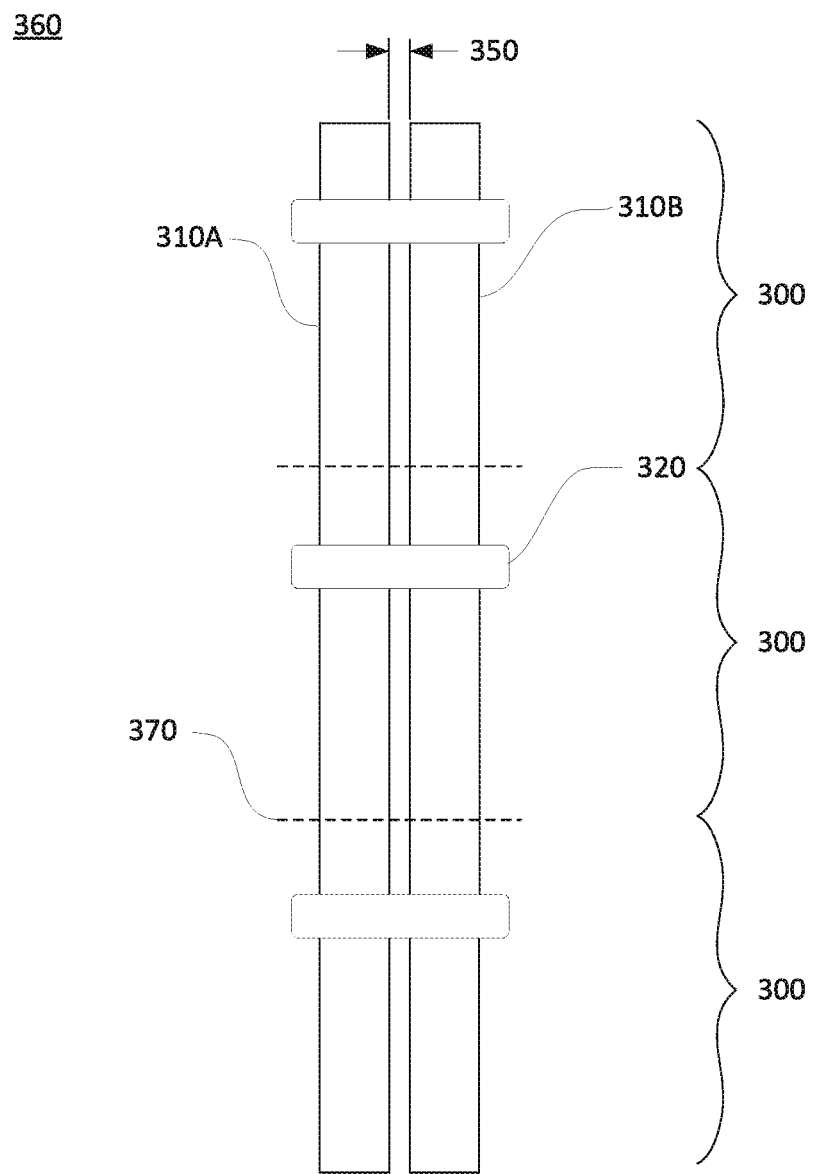
FIG. 3D illustrates a front view of a roll of tabs with unitary seals, in accordance with various aspects of the subject technology.

FIG. 3D illustrates a front view of a roll 360 of tabs 300 with unitary seals 320, in accordance with various aspects of the subject technology. The roll 360 comprises a long strip of the first tab 310A, a long strip of the second tab 310B, and the unitary seal 320 disposed at regular intervals along the strips 310A, 310B to space the strip of the first tab 310A apart from the strip of the second tab 310B to create the gap 350 between the first tab 310A and the second tab 310B. A plurality of tabs 300 may be created from the roll 360 by cutting the strips 310A and 310B into smaller portions at sections 370.

Figure 4A:
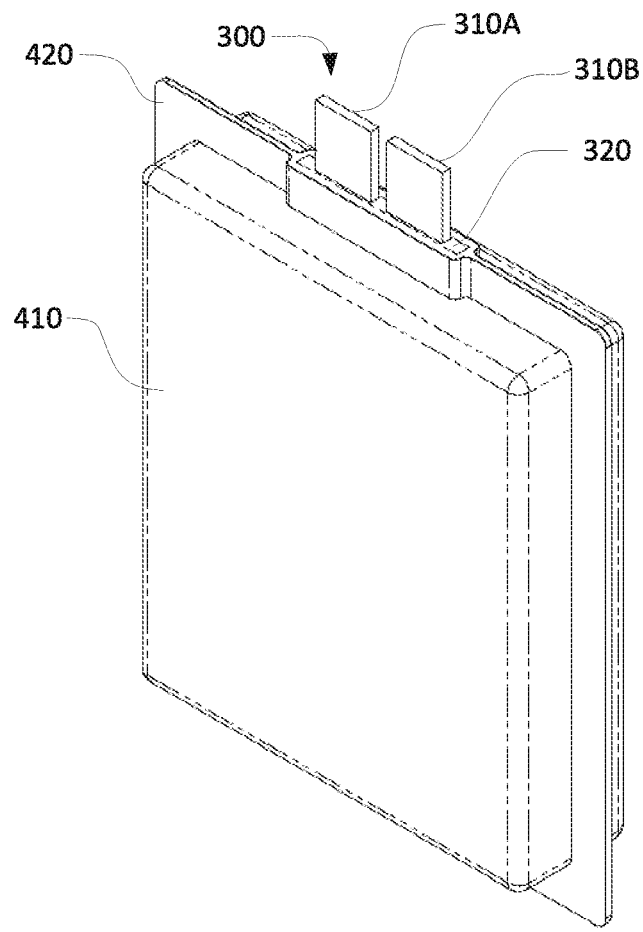
FIG. 4A illustrates a perspective view of a battery cell, in accordance with various aspects of the subject technology.

Referring to FIG. 4A, a perspective view of a battery cell 400 is illustrated, in accordance with various aspects of the subject technology. The battery cell 400 may correspond to a lithium-ion cell that supplies power to a portable electronic device such as a laptop computer, tablet computer, mobile phone, personal digital assistant (PDA), digital music player, watch, and wearable device, and/or other type of battery-powered electronic device. The battery cell 400 may include a plurality of layers enclosed by a pouch 410. The enclosed layers may comprise a cathode with an active coating, a separator, and an anode with an active coating, as discussed with reference to FIG. 5. The set of tabs 300 may extends from the pouch 410. The set of tabs 300 includes the first tab 310A, the second tab 310B, and the unitary seal 320. The first tab 310A may be coupled to the anode layers within the pouch. The second tab 310B may be coupled to the cathode layers within the pouch. The unitary seal 320 may surround the first tab 310A and the second tab 310B and may be disposed adjacent to a sealed periphery portion 420 of the pouch 410. The unitary seal 320 is configured to engage the periphery 420 of the pouch 410 and through application of heat, create a hermetic seal using the periphery 420 of the pouch 410.

In one aspect, the first tab 310A and the second tab 310B extend from the pouch 410 through the unitary seal 320. The first tab 310A and the second tab 310B provide terminals for the battery cell 400. The first tab 310A and the second tab 310B may be used to electrically couple the battery cell 400 with one or more other battery cells to form a battery pack. For example, the first tab 310A and the second tab 310B may be coupled to other battery cells in a series, parallel, or series-and-parallel configuration to form the battery pack.

To enclose the plurality of layers within the pouch 410, the layers may be sandwiched between flexible metallic sheets, such as aluminum, and enclosed via heat sealing along the periphery of the pouch 410. The plurality of layers may also be enclosed within the pouch 410 by folding a flexible metallic sheet and heat sealing the open ends or edges of the pouch 410. Alternatively, a punch may be used to form a cup in the pouch 410 to accommodate the plurality of layers.

The pouch 410 may include a nylon and/or polyether ether ketone (PEEK) layer applied on an outer surface of a metallic layer to repel moisture. The pouch 410 may also include an optional top layer of polyurethane to reduce reflectivity and provide a matte finish. The pouch 410 may also include a protective layer that may be polypropylene and/or olefin.

Figure 4B:
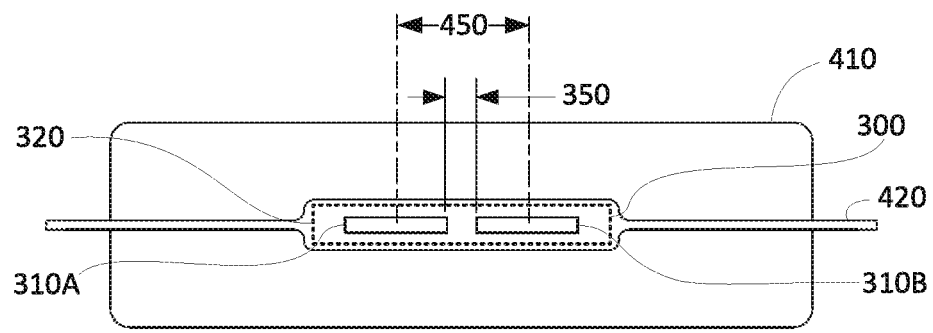
FIG. 4B illustrates a top view of a battery cell, in accordance with various aspects of the subject technology.

Referring to FIG. 4B, a top view of the battery cell 400 is illustrated, in accordance with various aspects of the subject technology. By utilizing the unitary seal 320 to space the first tab 310A apart from the second tab 310B, a controlled and narrow gap 350 may be create between the first tab 310A and the second tab 310B. For example, the gap 350 may be about 0.5 mm, 1.0 mm, 1.5 mm, 2.0 mm, 2.5 mm, 3.0 mm, 3.5 mm, 4.0 mm, 4.5 mm or 5.0 mm. In one aspect, the gap 350 between the first tab 310A and the second tab 310B may be less than 1.0 mm, 0.9 mm, 0.8 mm, 0.7 mm, 0.6 mm, 0.5 mm, 0.4 mm, 0.3 mm, 0.2 mm, or 0.1 mm. In another aspect, a distance 450 between the centerline of the first tab 310A and the centerline of the second tab 310B may be about 7.0 mm, 6.5 mm, 6.0 mm, 5.5 mm, 5.0 mm, 4.5 mm, 4.0 mm, 3.5 mm, 3.0 mm, 2.5 mm, 2.0 mm, 1.5 mm, or 1.0 mm. In some aspects, the unitary seal 320 reduces issues relating to tolerance stackup because the unitary seal 320 aligns, positions, and controls the gap 350 between the first tab 310A and the second tab 310B. In other aspects, by positioning the first tab 310A and the second tab 310B in close proximity to one another, packaging efficiency is improved and battery volume is decreased without compromising the integrity of the hermetic seal 420 of the pouch 410.

Figure 5:
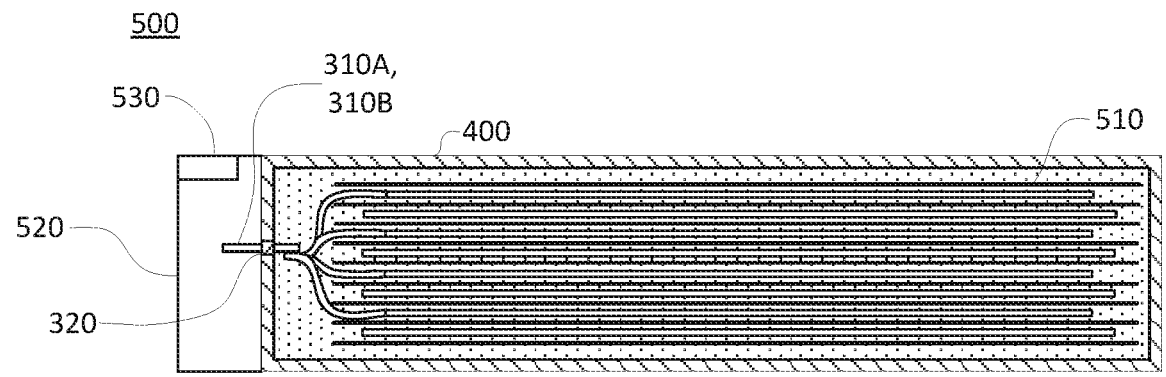
FIG. 5 illustrates a cross-section view of an assembled battery, in accordance with various aspects of the subject technology.

Referring to FIG. 5, a cross-section view of an assembled battery 500 is illustrated, in accordance with various aspects of the subject technology. The assembled battery 500 includes the battery cell 400, a battery management unit 520, and battery terminals 530. The battery management unit 520 is configured to manage recharging of the battery 500. The terminals 530 are configured to engage with corresponding connectors on a portable electronic device to provide power to components of the portable electronic device.

As described above with reference to FIG. 4A, the battery cell 400 includes a plurality of layers 510 comprising a cathode with an active coating, a separator, and an anode with an active coating. For example, the cathode may be an aluminum foil coated with a lithium compound (e.g., $LiCoO_2$, LiNCoMn, LiCoAl or $LiMn_2O_4$) and the anode may be a copper foil coated with carbon or graphite. The separator may include polyethylene (PP), polypropylene (PP), and/or a combination of PE and PP, such as PE/PP or PP/PE/PP. The separator comprises a micro-porous membrane that also provides a "thermal shut down" mechanism. If the battery cell reaches the melting point of these materials, the pores shut down which prevents ion flow through the membrane.

The plurality of layers 510 may be wound to form a jelly roll structure or can be stacked to form a stacked-cell structure. The plurality of layers 510 are enclosed within a pouch or casing and immersed in an electrolyte, which for example, can be a LiPF6-based electrolyte that can include Ethylene Carbonate (EC), Polypropylene Carbonate (PC), Ethyl Methyl Carbonate (EMC) or DiMethyl Carbonate (DMC). The electrolyte can also include additives such as Vinyl carbonate (VC) or Polyethylene Soltone (PS). The electrolyte can additionally be in the form of a solution or a gel.

The anode layers of the plurality of layers 510 are coupled to the first tab 310A. The cathode layers of the plurality of layers 510 are coupled to the second tab 310B. The first tab 310A and the second tab 310B extend from the battery cell 400 for electrical connection to other battery cells, the battery management unit 520, or other components as desired. The unitary seal 320 provides a hermetic seal to prevent the electrolyte solution from leaking out of the battery cell 400.

Figure 6:
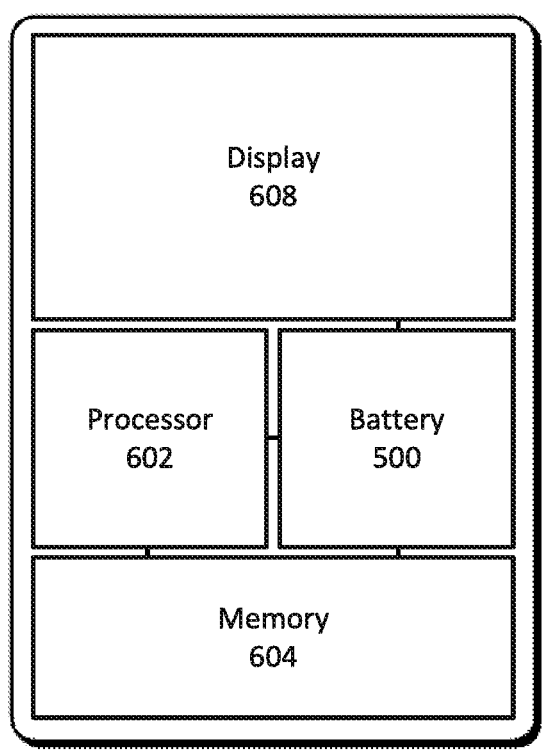
FIG. 6 illustrates a portable electronic device, in accordance with various aspects of the subject technology.

Referring to FIG. 6, a portable electronic device 600 is illustrated, in accordance with various aspects of the subject technology. The above-described rechargeable battery 500 can generally be used in any type of electronic device. For example, FIG. 6 illustrates a portable electronic device 600 which includes a processor 602, a memory 604 and a display 608, which are all powered by a battery 500. Portable electronic device 600 may correspond to a laptop computer, tablet computer, mobile phone, personal digital assistant (PDA), digital music player, watch, and wearable device, and/or other type of battery-powered electronic device. Battery 500 may correspond to a battery pack that includes one or more battery cells. Each battery cell may include a set of layers sealed in a pouch, including a cathode with an active coating, a separator, an anode with an active coating, and utilize a set of common tabs extending from the pouch and spaced apart using a unitary seal.

Figure 7:
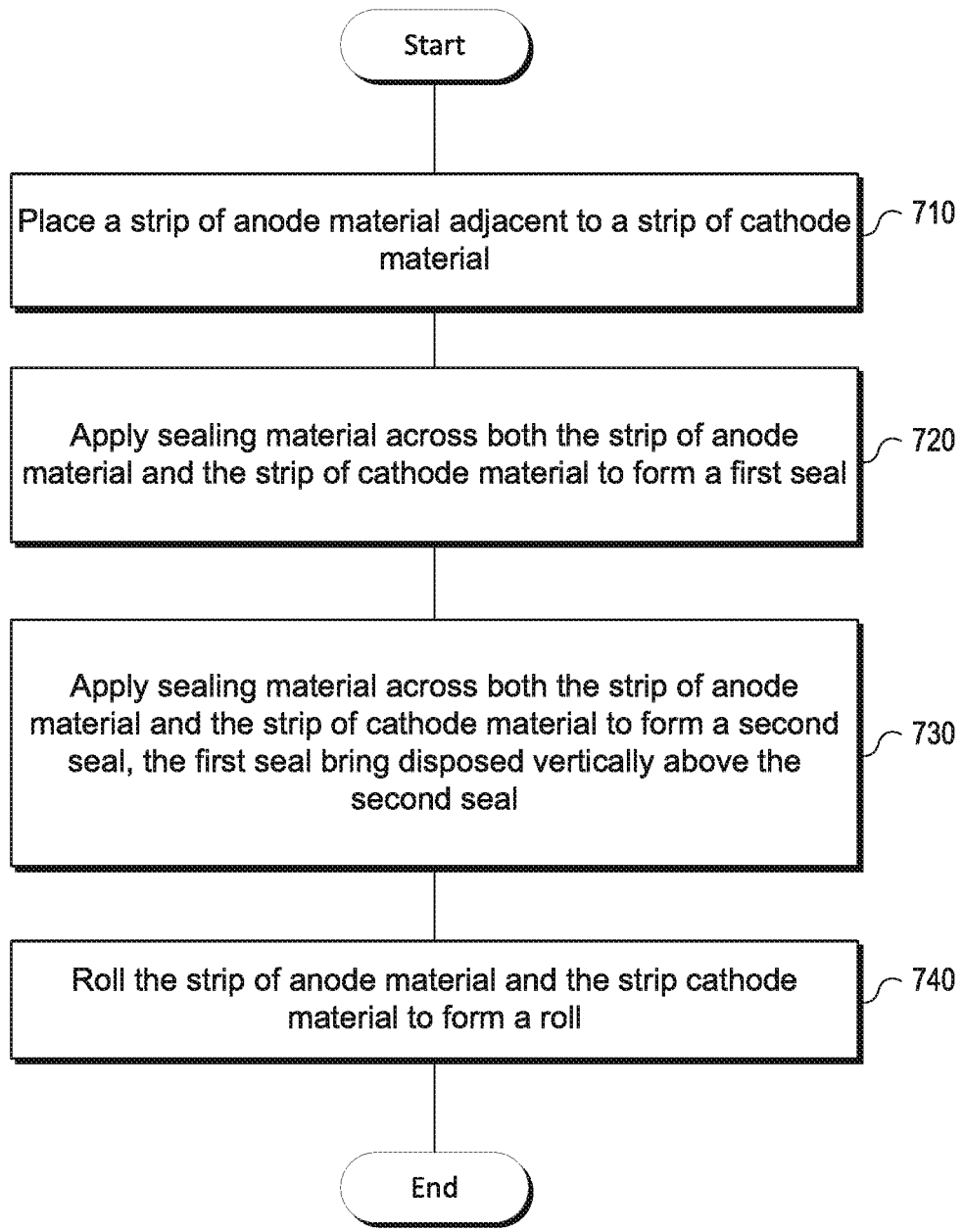
FIG. 7 illustrates an example method for manufacturing a roll of anode and cathode tabs, in accordance with various aspects of the subject technology.

FIG. 7 illustrates an example method 700 for manufacturing a roll of anode and cathode tabs, in accordance with various aspects of the subject technology. It should be understood that, for any process discussed herein, there can be additional, fewer, or alternative steps performed in similar or alternative orders, or in parallel, within the scope of the various embodiments unless otherwise stated.

At operation 710, a strip of anode material placed or disposed adjacent to a strip of cathode material. As discussed above, the anode material may be graphite, gold, platinum, carbon, silver, mercury, copper, copper-plated aluminum, titanium, lead, tin, nickel, cobalt, a combination thereof, or other anodic materials as would be known by a person of ordinary skill in the art. The cathode material may be lithium, potassium, sodium, magnesium, beryllium, aluminum, manganese, zinc, chromium, iron, cadmium, brass, cobalt, nickel, tin, lead, a combination thereof, or other cathodic materials as would be known by a person of ordinary skill in the art.

At operation 720, a sealing material is applied across both the strip of anode material and the strip of cathode material to form a first unitary seal. The sealing material may be polypropylene, copolymers of ethylene and acrylic acid, polyamide resins, polyester resins, ionomers, poly urethane resins, polyethylene resin (high as well as low density), nutrient cellophane, acetate films, hard and soft vinyl chloride film, polyvinylidene chloride film, polystyrene film, polycarbonate film, nylon film, or polyethylene cellophane. In one aspect, the sealing material may completely surround a portion of the strip of anode material and/or the strip of cathode material. The sealing material may be applied in liquid or gel form and set or cured thereafter.

At operation 730, the sealing material is applied across both the strip of anode material and the strip of cathode material to form a second unitary seal. The first unitary seal may be disposed vertically above the second unitary seal. In one aspect, the first unitary seal and the second unitary seal may have substantially similar dimensions and geometry. In another aspect, the first unitary seal and the second unitary seal space or position the strip of anode material apart from the strip of cathode material to create a gap between the strip of anode material and the strip of cathode material. The gap 350 may be about 0.5 mm, 1 mm, 1.5 mm, 2 mm, 2.5 mm, 3 mm, 3.5 mm, 4 mm, 4.5 mm or 5.0 mm. In one aspect, the gap 350 between the first tab 310A and the second tab 310B may be less than 1.0 mm, 0.9 mm, 0.8 mm, 0.7 mm, 0.6 mm, 0.5 mm, 0.4 mm, 0.3 mm, 0.2 mm, or 0.1 mm.

At operation 740, the strip of anode material and the strip of cathode material are rolled to form a roll of anode material and cathode material intermittently connected by the sealing material or the unitary seals.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
arranging an anode tab adjacent to a cathode tab;
disposing a sealing material adjacent to a portion of the anode tab and a portion of the cathode tab;
heating the sealing material to cause the sealing material to bond to the portion of the anode tab and the portion of the cathode tab;
heating the sealing material to cause the sealing material to flow and surround the portion of the anode tab and the portion of the cathode tab; and
curing the sealing material to completely surround the portion of the anode tab and the portion of the cathode tab to form a unitary seal, wherein the anode tab, cathode tab and unitary seal form a tab assembly;
providing a battery cell comprising a plurality of layers, wherein the plurality of layers comprise an anode with an active coating, a separator, and a cathode with an active coating;
connecting the anode tab of the tab assembly to the anode; and
connecting the cathode tab of the tab assembly to the cathode.

2. The method of claim 1, further comprising heating the sealing material to cure the sealing material.

3. The method of claim 1, wherein the unitary seal spaces the anode tab apart from the cathode tab to create a gap between the anode tab and the cathode tab of about 2.5 to 3.5 mm.

4. The method of claim 1, wherein the anode tab comprises a first conductive material and the cathode tab comprises a second conductive material, wherein the second conductive material is different from the first conductive material.

5. The method of claim 1, wherein the anode tab comprises at least one of copper, copper-plated aluminum, nickel, titanium, and platinum.

6. The method of claim 1, wherein the cathode tab comprises at least one of aluminum, zinc, and iron.

7. The method of claim 1, wherein the unitary seal comprises an integrally molded seal.

8. The method of claim 1, wherein the unitary seal arranges the anode tab to be parallel with the cathode tab.

9. The method of claim 1, wherein the sealing material comprises at least one of polypropylene, copolymers, polyamide resins, polyester resins, ionomers, polyurethane resins, polyethylene resin, nutrient cellophane, acetate film, vinyl chloride film, polyvinylidene chloride film, polystyrene film, polycarbonate film, nylon film, and polyethylene cellophane.

10. A method comprising:
placing a strip of anode material adjacent to a strip of cathode material;
applying a sealing material across both the strip of anode material and the strip of cathode material to form a first unitary seal;
applying the sealing material across both the strip of anode material and the strip of cathode material to form a second unitary seal, the first unitary seal disposed vertically above the second unitary seal;
cutting the strip of anode material and the strip of cathode material to form a tab assembly comprising an anode tab and a cathode tab that are connected by the first unitary seal;
providing a battery cell comprising a plurality of layers, wherein the plurality of layers comprises an anode with an active coating, a separator, and a cathode with an active coating;
connecting the anode tab of the tab assembly to the anode; and
connecting the cathode tab of the tab assembly to the cathode.

11. The method of claim 10, wherein the first unitary seal spaces the anode tab apart from the cathode tab to create a controlled gap between the anode tab and the cathode tab.

12. The method of claim 10, wherein the first unitary seal arranges the anode tab to be parallel with the cathode tab.

13. The method of claim 10, wherein the first unitary seal is formed by curing the sealing material to completely surround a first portion of the strip of anode material and a first portion of the strip of cathode material and the second unitary seal is formed by curing the sealing material to completely surround a second portion of the strip of anode material and a second portion of the strip of cathode material.

14. The method of claim 10, wherein the strip of anode material comprises a first conductive material and the strip of cathode material comprises a second conductive material, wherein the second conductive material is different from the first conductive material.

15. The method of claim 10, wherein the strip of anode material comprises at least one of copper, copper-plated aluminum, nickel, titanium, and platinum.

16. The method of claim 10, wherein the strip of cathode material comprises at least one of aluminum, zinc, and iron.

17. The method of claim 10, wherein the sealing material comprises at least one of polypropylene, copolymers, polyamide resins, polyester resins, ionomers, polyurethane resins, polyethylene resin, nutrient cellophane, acetate film vinyl chloride film polyvinylidene chloride film, polystyrene film, polycarbonate film, nylon film, and polyethylene cellophane.

18. A method comprising:
arranging an anode tab adjacent to a cathode tab;
disposing a sealing material adjacent to a portion of the anode tab and a portion of the cathode tab;
curing the sealing material to completely surround the portion of the anode tab and the portion of the cathode tab to form a unitary seal, wherein the anode tab, cathode tab and unitary seal form a tab assembly;
providing a battery cell comprising a plurality of layers, wherein the plurality of layers comprises an anode with an active coating, a separator, and a cathode with an active coating;
connecting the anode tab of the tab assembly to the anode; and
connecting the cathode tab of the tab assembly to the cathode.

19. The method of claim 18, wherein the unitary seal spaces the anode tab apart from the cathode tab to create a controlled gap between the anode tab and the cathode tab.

20. The method of claim 18, wherein the anode tab comprises a first conductive material and the cathode tab comprises a second conductive material, wherein the second conductive material is different from the first conductive material.

21. The method of claim 18, wherein the sealing material comprises at least one of polypropylene, copolymers, polyamide resins, polyester resins, ionomers, polyurethane resins, polyethylene resin, nutrient cellophane, acetate film, vinyl chloride film polyvinylidene chloride film, polystyrene film, polycarbonate film, nylon film, and polyethylene cellophane.

22. The method of claim 19, wherein the controlled gap is about 2.5 to 3.5 mm.

23. The method of claim 18, wherein the unitary seal arranges the anode tab to be parallel with the cathode tab.

24. The method of claim 18, wherein the anode tab comprises at least one of copper, copper-plated aluminum, nickel, titanium, and platinum.

25. The method of claim 18, wherein the cathode tab comprises at least one of aluminum, zinc, and iron.

* * * * *